United States Patent Office 3,348,949
Patented Oct. 24, 1967

3,348,949
PHOTOGRAPHIC LIGHT-SENSITIVE MATERIALS
Konrad Jerzy Bannert and Elvin Frederick William Thurston, Ilford, Essex, England, assignors to Ilford Limited, Ilford, England, a British company
No Drawing. Filed Mar. 16, 1964, Ser. No. 352,328
Claims priority, application Great Britain, Apr. 19, 1963, 15,581/63; June 24, 1963, 25,066/63
4 Claims. (Cl. 96—104)

ABSTRACT OF THE DISCLOSURE

Dye-sensitized photographic silver halide emulsions containing a supersensitizing combination of sensitizing dye and another substance whereby the emulsion is made sensitive to light in wavelengths other than in the ultra-violet and/or blue regions, e.g. the red region, of the spectrum. The supersensitizing combination comprises a sensitizing cyanine dye of specific structure and a benzimidazole dye also of specific structure.

---

This invention relates to photographic light-sensitive materials and more particularly to the manufacture of dye-sensitised photographic silver halide emulsions.

Photographic silver halide emulsions have a certain natural sensitivity to light, but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion, together with a sensitising dye, a second substance which may or may not itself be a sensitiser, there may sometimes be imparted to the emulsion an additional sensitivity beyond that which can be regarded as the sum effect of the separate substances. Combinations of sensitising dye and another substance which give this latter result are known as supersensitising combinations.

The present invention is based on the discovery of a new supersensitising combination of the type just referred to.

According to the present invention there is provided a photographic silver halide emulsion which contains a sensitising dye of the general Formula I:

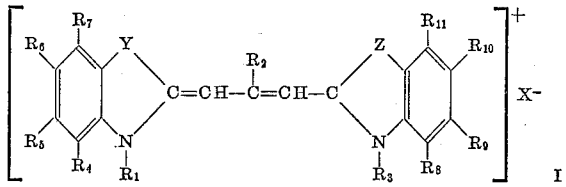

or of the general Formula II:

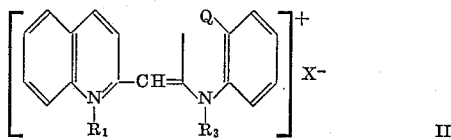

where Y represents an oxygen, sulphur or selenium atom, Z represents a sulphur or selenium atom, Q represents a sulphur atom or a —CH=CH— group, $R_1$ and $R_3$ are the same or different and each represent an alkyl or carbamoylethyl group, $R_2$ is an alkyl group, $R_5$ and $R_6$ and $R_9$ and $R_{10}$, are the same or different and each represent a hydrogen or a halogen atom, or an alkyl, aryl or alkoxy group, or either $R_5$ and $R_6$ or $R_9$ and $R_{10}$ taken as pairs represent a methylenedioxy group, $R_4$ and $R_8$ are the same or different and each represent a hydrogen atom, or, together with $R_5$ and $R_9$, form part of a benzene ring, $R_7$ and $R_{11}$ are the same or different and each represent a hydrogen atom or, together with $R_6$ and $R_{10}$, form part of a benzene ring, and X is an anion, together with a benzimidazole dye of the general Formula III:

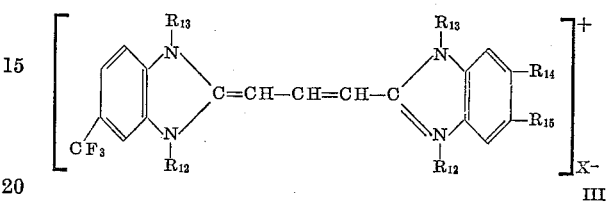

where the groups $R_{12}$ are the same or different and are each an alkyl, aralkyl or hydroxyalkyl group or a sulphoalkyl group of the formula $HO_3S$—$(CH_2)_n$— where $n$ is an integer from 1 to 6, the groups $R_{13}$ are the same or different and are each an alkyl, aralkyl or aryl group, $R_{14}$ represents a hydrogen or halogen atom and $R_{15}$ represents a hydrogen or halogen atom or, where $R_{14}$ is hydrogen, may be a trifluoromethyl group, and X is an anion, or a corresponding anhydro dye to a said dye where $R_{12}$ is sulphoalkyl, in which X is a hydroxy group.

By the use of a combination of dyes as just set forth a valuable supersensitising effect is obtained, as illustrated by the specific examples which are set forth later herein.

Referring to the general formulae it is to be noted that where alkyl groups are referred to these are preferably lower alkyl groups, i.e. containing 1 to 4 carbon atoms, though they may be higher alkyl groups. Where aralkyl groups are referred to these may be benzyl, naphthylmethyl or the like, and where aryl groups are referred to these may be phenyl or naphthyl and may include substituent groups such as alkyl groups or halogen atoms which do not destroy the sensitising action of the compounds.

The symbol X represents any anion (and may be different in the different classes of compounds) but generally will be a halide ion or a sulphate, sulphonate, aryl sulphonate or perchlorate ion. The anhydro derivatives mentioned represent the case where X=hydroxide.

Dyes of general Formulae I and II are known per se from the literature. Dyes of general Formula III may be made either by the synthetic methods described by L. M. Yagupol'skii and V. I. Troitskaya in Zhur. Obschei. Khim., 1959, 29, 2409, using those methods exactly when producing the dyes described by these authors and using directly analogous methods for other dyes of the class with appropriate variation in the nature of the starting materials.

Specific groups of dyes of Formula III of value according to the invention area:

(a) Those in which $R_{12}$=alkyl or aralkyl; $R_{13}$=alkyl, aryl or aralkyl; $R_{14}$=hydrogen; $R_{15}$=CF$_3$; and the other symbols of Formula III have the meanings assigned to them above.

(b) Those in which $R_{12}$ is alkyl, aralkyl or a sulphoalkyl group of the formula $HO_3S$—$(CH_2)_n$— where $n$ is an integer from 1 to 6, $R_{13}$ is alkyl, aralkyl or aryl, $R_{14}$ is hydrogen, $R_{15}$ is $CF_3$, and the other symbols have the meanings assigned to them above.

(c) Those in which $R_{12}$ is an hydroxyalkyl group. $R_{13}$ is an alkyl group, $R_{14}$ and $R_{15}$ are each a hydrogen or halogen atom, and the other symbols have the meanings assigned to them above.

The following are illustrative example of the preparation of supersensitised photographic silver halide emulsions according to the invention:

*Examples*

The following dyes were employed.

Dyes of Formula I:

(A) Bis(5-chloro-3-methyl-2-benzothiazole) β-methyltrimethinecyanine iodide
(B) (3-2'carbamoylethyl-5,6-dimethoxy-2-benzothiazole) (3 - ethyl - 2-benzothiazole) β-methyltrimethinecyanine iodide
(C) (3-ethyl-5,6-dimethoxy-2-benzothiazole) (3-ethyl-2-benzothiazole) β-methyltrimethinecyanine iodide
(D) Bis(3-ethyl-2-naphtho[1,2d]thiazole) β-methyltrimethinecyanine chloride
(E) Bis(5-chloro-3-methyl-2-benzothiazole) β-ethyltrimethinecyanine iodide
(F) Bis(5-chloro-3-ethyl-2-benzothiazole) β-ethyltrimethinecyanine chloride
(G) Bis(3-ethyl-2-benzothiazole)-β-methyltrimethinecyanine bromide.

Dyes of Formula II:

(H) Pseudocyanine
(I) (3-2'-carbamoylethyl-2-benzothiazole) (1-ethyl-2-quinoline) monomethinecyanine iodide (preparation described in co-pending application No. 46,156/62).

Dyes of Formula III:

(J) Bis(3-ethyl-1-phenyl-5-trifluoromethyl-2-benzimidazole) trimethinecyanine iodide
(K) Bis(1,3-diethyl-5-trifluoromethyl-2-benzimidazole) trimethinecyanine iodide
(L) Bis(1-ethyl-3-methyl-5-trifluoromethyl-2-benzimidazole) trimethinecyanine iodide
(M) Bis(1,3-dimethyl-5-trifluoromethyl-2-benzimidazole) trimethinecyanine iodide
(N) Anhydro-5,5'-bis-trifluoromethyl-1,1'-diethyl-3,3'-di(sulphobutyl) benzimidazolo carbocyanine hydroxide
(P) (1,3-diethyl-5-chloro-2-benzimidazole) [1-ethyl-3-(2-hydroxyethyl)-5-trifluoromethyl-2-benzimidazole] trimethinecyanine iodide
(Q) (1,3 - diethyl-5,6-dichoro-2-benzimidazole) [1-ethyl-3-(2-hydroxyethyl)-5-trifluoromethyl-2-benzimidazole] trimethinecyanine iodide.

The combinations of a dye of Formulae I or II and a dye of Formula III were added to a fast gelatino silver iodobromide emulsion containing 3.2 mol. percent of silver iodide. It was found that the dyes could be added together or separately and either before or after the customary addition of general sensitising agents such as sulphur compounds and gold salts. Where appropriate, control tests were made with either one or the other of the dyes used alone.

The following table illustrates the effect of the supersensitisation. Speeds were measured to light passing a tricolour red filter in the cases marked "Red" and to light passing a Minus blue filter in the cases marked "Minus-blue," speed being determined as necessary to give a density of 0.1 above fog level and being quoted on a log scale in relative terms, higher figures representing higher speeds.

| Formula I and II dye addition per 1.5 gm. moles Ag | Formula III dye addition per 1.5 gm. moles Ag | Relative log speed of emulsion |
|---|---|---|
| 50 mg. dye A | | 2.34 Red |
| 50 mg. dye A | 100 mg. dye J | 2.50 Red |
| | 100 mg. dye J | 1.60 Red |
| 125 mg. dye A | | 2.65 Red |
| 125 mg. dye A | 125 mg. dye K | 3.25 Red |
| | 125 mg. dye K | <1.40 Red |
| 100 mg. dye A | | 2.81 Red |
| 100 mg. dye A | 100 mg. dye L | 3.13 Red |
| | 100 mg. dye L | <1.40 Red |
| 90 mg. dye B | | 2.76 Red |
| 90 mg. dye B | 30 mg. dye K | 2.83 Red |
| 90 mg. dye B | 90 mg. dye K | 3.07 Red |
| 90 mg. dye C | | 3.27 Red |
| 90 mg. dye C | 90 mg. dye K | 3.48 Red |
| 90 mg. dye D | | 3.74 Red |
| 90 mg. dye D | 30 mg. dye K | 4.00 Red |
| 90 mg. dye D | 90 mg. dye K | 4.10 Red |
| | 30 mg. dye K | <1.4 Red |
| | 90 mg. dye K | <1.4 Red |
| 50 mg. dye E | | 3.89 Red |
| 35 mg. dye E | 15 mg. dye N | 3.96 Red |
| 15 mg. dye E | 35 mg. dye N | 3.89 Red |
| | 50 mg. dye N | <1.4 Red |
| 50 mg. dye D | | 3.65 Red |
| 35 mg. dye D | 15 mg. dye N | 3.82 Red |
| 15 mg. dye D | 35 mg. dye N | 3.76 Red |
| | 50 mg. dye N | <1.4 Red |
| 50 mg. dye A | | 2.18 Red |
| 35 mg. dye A | 15 mg. dye M | 2.27 Red |
| 15 mg. dye A | 35 mg. dye M | 2.42 Red |
| | 50 mg. dye M | <1.4 Red |
| 50 mg. dye H | | 3.04 Minus-blue |
| 35 mg. dye H | 15 mg. dye N | 4.07 Minus-blue |
| 15 mg. dye H | 35 mg. dye N | 3.99 Minus-plue |
| | 50 mg. dye N | 3.87 Minus-blue |
| | 150 mg. dye L | 4.15 Minus-blue |
| 150 mg. dye H | | 3.40 Minue blue |
| 75 mg. dye H | 75 mg. dye L | 4.22 Minue-blue |
| 75 mg. dye H | 125 mg. dye L | 4.25 Minus-blue |
| 125 mg. dye H | 75 mg. dye L | 4.24 Minus-blue |
| 50 mg. dye I | | 3.45 Minus-blue |
| 35 mg. dye I | 15 mg. dye L | 3.75 Minus-blue |
| 15 mg. dye I | 35 mg. dye L | 3.55 Minus-blue |
| | 50 mg. dye L | 3.60 Minus-blue |
| 60 mg. dye A | | 2.13 Red |
| 60 mg. dye A | 125 mg. dye P | 3.49 Red |
| | 125 mg. dye P | <1.40 Red |
| 60 mg. dye A | 60 mg. dye Q | 3.38 Red |
| | 60 mg. dye Q | <1.40 Red |
| 50 mg. dye D | | 3.35 Red |
| 50 mg. dye D | 50 mg. dye Q | 3.73 Red |
| | 50 mg. dye Q | <1.40 Red |
| 50 mg. dye F | | 3.75 Red |
| 50 mg. dye F | 50 mg. dye Q | 3.88 Red |
| | 50 mg. dye Q | <1.40 Red |
| 100 mg. dye G | | 3.99 Minus-blue |
| 75 mg. dye G | 25 mg. dye P | 4.06 Minue-blue |
| 100 mg. dye H | | 2.92 Minus-blue |
| 25 mg. dye H | 75 mg. dye P | 4.06 Minue-blue |
| | 100 mg. dye P | 3.92 Minue-blus |

Using the following dye of Formula I: Dye AA, bis (5,6 - methylenedioxy-3-ethyl-2-benzthiazole) β - methyl trimethinecyanine iodide, the following results were obtained:

| Formula I and II dye addition per 1.5 gm. moles Ag | Formula III dye addition per 1.5 gm. moles Ag | Relative log speed of emulsion |
|---|---|---|
| 90 mg. dye AA | | 3.49 Red |
| 90 mg. dye AA | 90 mg. dye K | 4.56 Red |
| | 90 mg. dye K | 1.4 Red |

It will be observed from the foregoing data that the dyes of Formula III do not themselves sensitise the emulsion in the red region of the spectrum and hence the overall increase in speed due to the combination is a true supersensitising effect.

Compounds of general Formula III wherein $R_{14}$ and $R_{15}$ are each hydrogen or halogen may be prepared by reacting a quaternary salt of the formula:

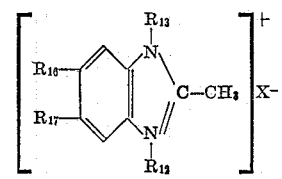

with a compound of the formula:

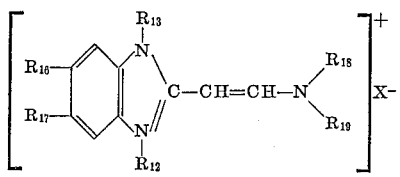

where $R_{12}$ and $R_{13}$ have the meaning assigned above, one of the vicinal pairs of groups $R_{16}$ and $R_{17}$ is constituted by two hydrogen atoms, two halogen atoms or a hydrogen atom and a halogen atom and the other of the vicinal pairs of groups $R_{16}$ and $R_{17}$ is constituted by $R_{16}$ being a hydrogen atom and $R_{17}$ being a trifluoromethyl group, $R_{18}$ is an aryl group, $R_{19}$ is an aryl group containing a sulphonyl group and X is an anion.

We claim as our invention:

1. A photographic silver halide emulsion which contains a sensitising dye selected from the class consisting of a dye of the formula:

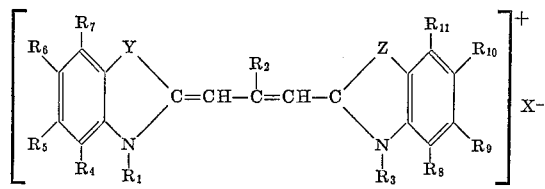

and a dye of the formula:

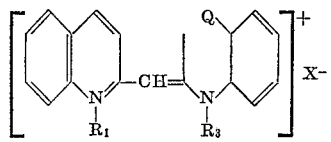

where Y is selected from the class consisting of oxygen, sulphur and selenium atom, Z is selected from the class consisting of sulphur and selenium, Q is selected from the class consisting of sulphur and a —CH=CH— group, $R_1$ and $R_3$ are each selected from the class consisting of alkyl and carbamoylethyl, $R_2$ is an alkyl group, $R_5$ and $R_6$ and $R_9$ and $R_{10}$, taken singly are each selected from the class consisting of hydrogen, halogen, alkyl, aryl and alkoxy, and taken in pairs of vicinal groups are methylenedioxy, $R_4$ and $R_8$ taken singly each represent a hydrogen atom and taken together with $R_5$ and $R_9$ form part of a benzene ring, $R_7$ and $R_{11}$ taken singly represent a hydrogen atom and taken together with $R_6$ and $R_{10}$ form part of a benzene ring, and X is an anion, together with a benzimidazole dye selected from the class consisting of dyes of the general formula:

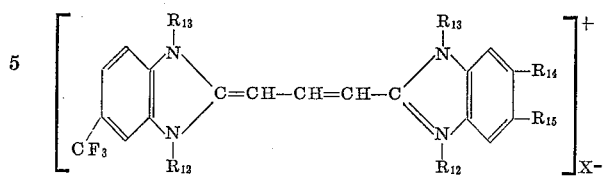

where the groups $R_{12}$ are severally selected from the class consisting of alkyl, aralkyl, hydroxyalkyl and sulphoalkyl of the formula $HO_3S$—$(CH_2)_n$— where $n$ is an integer from 1 to 6, the groups $R_{13}$ are severally selected from the class consisting of alkyl, aralkyl and aryl, $R_{14}$ is selected from the class consisting of hydrogen and halogen and $R_{15}$ is selected from the class consisting of hydrogen, halogen and, where $R_{14}$ is hydrogen, trifluoromethyl, and X is an anion, and corresponding anhydro dyes where $R_{12}$ is sulphoalkyl and in which X is a hydroxy group.

2. A photographic emulsion according to claim 1 wherein, in the benzimidazole dye of the said formula, $R_{12}$ is selected from the class consisting of alkyl and aralkyl, $R_{13}$ is selected from the class consisting of alkyl, aryl and aralkyl, $R_{14}$ is hydrogen, $R_{15}$ is $CF_3$, and the other symbols have the meanings assigned to them in claim 1.

3. A photographic emulsion according to claim 1 wherein, in the benzimidazole dye of the said formula, $R_{12}$ is selected from the class consisting of alkyl, aralkyl and sulphoalkyl of the formula $HO_3S$—$(CH_2)_n$— where $n$ is an integer from 1 to 6, $R_{13}$ is selected from the class consisting of alkyl, aralkyl and aryl, $R_{14}$ is hydrogen, $R_{15}$ is $CF_3$, and the other symbols have the meanings assigned to them in claim 1.

4. A photographic emulsion according to claim 1 wherein, in the benzimidazole dye of the said formula, $R_{12}$ is an hydroxyalkyl group, $R_{13}$ is an alkyl group, $R_{14}$ and $R_{15}$ are each selected from the class consisting of hydrogen and halogen and the other symbols have the meanings assigned to them in claim 1.

References Cited

UNITED STATES PATENTS 2,256,163   9/1941   Kumetat et al. _____ 260—240.6

FOREIGN PATENTS 537,025   2/1957   Canada.

OTHER REFERENCES

Yagupolskii et al.: Chemical Abstracts, pages 11,000-1, 1960, volume 54.

NORMAN G. TORCHIN, *Primary Examiner.*

J. P. BRAMMER, *Assistant Examiner.*